United States Patent [19]
Choi et al.

[11] Patent Number: 5,934,810
[45] Date of Patent: Aug. 10, 1999

[54] HEMISPHERIC FLUID BEARING APPARATUS

[75] Inventors: Jin-seung Choi, Seoul; Chang-woo Lee, Kyonggi-do, both of Rep. of Korea

[73] Assignee: Samsung Electronics Co., Ltd., Kyungki-Do, Rep. of Korea

[21] Appl. No.: 08/978,030

[22] Filed: Nov. 25, 1997

[30] Foreign Application Priority Data

Nov. 25, 1996 [KR] Rep. of Korea .................. 96-57180

[51] Int. Cl.⁶ .................................................... F16C 17/10

[52] U.S. Cl. ........................................................... 384/108

[58] Field of Search ......................... 384/108, 109, 384/206, 208, 209

[56] References Cited

U.S. PATENT DOCUMENTS

| | | | |
|---|---|---|---|
| 5,709,480 | 1/1998 | Hong | 384/108 |
| 5,760,509 | 6/1998 | Chung | 384/108 |
| 5,801,464 | 9/1998 | Brezoczky | 384/108 |

*Primary Examiner*—Leonard A. Footland
*Attorney, Agent, or Firm*—Sughrue, Mion, Zinn Macpeak & Seas, PLLC

[57] ABSTRACT

A hemispheric bearing apparatus which enables a bushing to rotate without contacting a hemisphere. The hemispheric bearing apparatus according to the present invention includes hemispheres, the bushing which has hemispheric grooves formed at both ends, for receiving the hemispheres, and a spring for forcing the hemisphere or the bushing to each other in order for the hemisphere to be closely positioned with the bushing.

5 Claims, 2 Drawing Sheets

HEMISPHERIC FLUID BEARING APPARATUS

BACKGROUND OF THE INVENTION

1. Field of the Invention

The present invention relates to a hemispheric fluid bearing apparatus, and more particularly to a hemispheric fluid bearing apparatus, without a spacer, capable of adjusting a clearance between hemispheres and a bushing.

2. Description of the Prior Art

Recently, with improvements in the fields of information and computer technologies, computers, audio systems and image devices have become more compact, as a result there has arisen a need for parts of the computer, the audio system, and the image device to have high accuracy.

Driving motors for various machines such as a spindle motor of a hard disk drive in the field of auxiliary memory devices, a scanning motor of a laser printer in the field of computers, a driving apparatus for driving a laser disk and a compact disk in audio systems, and a head driving motor of a video cassette recorder and a camcorder, commonly rotate a rotary shaft mounted in the driving motors with high velocity to carry out recording and reproducing of data.

The rotary shaft rotates at very high velocity while creating an oscillation and a vibration. Thus, the computer, the laser printer, the audio system, the video cassette recorder, the camcorder, and the like which use the rotary shaft, may experience critical defects.

Accordingly, bearings are used for overcoming the problems generated by the high velocity rotation of the rotary shaft of the driving motor. There are several kinds of bearings, but, preferably, a fluid bearing apparatus is used for the rotary shaft rotating at high velocity.

A driving device for driving a polygon mirror of a laser printer, to which a hemispheric fluid bearing is applied, will be described in detail with reference to FIG. 1.

The driving device for driving a polygon mirror 10 includes a fixed shaft 20 which acts as a rotating center of the polygon mirror 10, hemispheres 30 and 35 which are press-fitted to the fixed shaft 20 and have spheric surfaces with high sphericity, a bushing 40 for supporting a radial load and a thrust load of the hemispheres 30 and 35, a rotor 55 and a stator 50 which are a driving device, a hub 60, and a housing 70.

In an assembling of the polygon mirror 10, the fixed shaft 20, the hemispheres 30 and 35, and the bushing 40, the fixed shaft 20 is press-fitted to the housing 70 to which the hemispheres 30 and 35 are press-fitted. Dynamic pressure generating grooves (not shown) are formed on spheric surfaces of the hemispheres 30 and 35 in order to generate a predetermined fluid pressure. Furthermore, the hub 60 is assembled to the bushing 40, on which the rotor 55 and the polygon mirror 10 are mounted. In the result, hemispheres 30 and 35 are fixed to the shaft 20 which is press-fitted to the housing 70 while the bushing 40 rotates around the shaft 20.

The bushing 40 for supporting the radial load and the thrust load has a through hole having a diameter larger than that of the shaft 20 perforated, in which hemispheric grooves 30a and 35a are formed at both ends thereof to be opposite to each other. A curvature of the hemispheric grooves 30a and 35a is same as that of the hemispheres 30 and 35 which are press-fitted to the fixed shaft 20. Also, a spacer 40a is inserted into the throughhole of the bushing 40 so as to adjust a clearance between the hemispheres 30 and 35 and the bushing 40.

An operation of the hemispheric fluid bearing apparatus according to the conventional art, as constructed above, will be described in detail.

When electric power is applied to the stator 50 and the rotor 55 so that the bushing 40 rotates, the bushing 40 moves downwardly by means of self-weight so as to be in close contact with the lower hemisphere 30. Thus, the upper hemisphere 35 is spaced from the bushing 40 by several $\mu$m. As a result, the dynamic pressure is higher at the lower hemisphere 30 having the smaller clearance between the bushing 40 than at the upper hemisphere 35 having the larger clearance between the bushing 40. This uneven distribution of the bushing causes vibrations and other problems.

SUMMARY OF THE INVENTION

The present invention has been made to overcome the above described problem of the prior art. It is an object of the present invention to provide a hemispheric bearing apparatus capable of adjusting a clearance between a hemisphere and a bushing without a spacer, in which the hemisphere can be vertically movable along a fixed shaft.

To accomplish the above object of the present invention, there is provided a hemispheric bearing apparatus comprising:

a shaft fixed to a lower housing;

a first hemisphere which is press-fitted to the shaft;

a second hemisphere which is spaced at a predetermined distance apart from the first hemisphere as to be opposed to the first hemisphere and is slidably mounted on the shaft in a vertical direction;

a bushing having first and second hemispheric grooves formed to respectively receive the first and second hemisphere; and a hemisphere pressing member for resiliently pressing the second hemisphere into the second hemispheric groove so that the second hemisphere is in close contact with the hemispheric groove.

The hemisphere pressing member includes a stopper which is spaced apart from the second hemisphere and mounted on the shaft so as to be secured to the shaft, and a spring which is disposed between the hemisphere and the stopper so as to be connected to the second hemisphere at one end thereof and to be secured to the stopper at the other end thereof, for pressing the second hemisphere with a resilient force.

At least one projection is formed on an intermediate portion of the shaft to extend along a surface of the shaft and grooves corresponding to the projections are formed in the second hemisphere to receive the projections.

In an aspect of the present invention, the hemispheric fluid bearing comprises:

a shaft which is fixed to a lower housing;

first and second hemispheres which are spaced at a predetermined distance apart from each other and mounted on the shaft as to be opposed to each other;

a first bushing having a first hemispheric groove to receive the first hemisphere;

a second bushing having a second hemispheric groove to receive the second hemisphere, the second bushing being spaced at a predetermined distance apart from the first bushing;

a means for resiliently spacing the first bushing apart from the second bushing at the predetermined distance; and a means for combining the first bushing with the second bushing as to rotate them simultaneously.

The resilient means includes a spring which is disposed in annular grooves respectively formed at a predetermined depth in the first bushing and the second bushing.

The spring is a coil spring.

Preferably, the spring is a leaf spring which is wound in a spiral shape and the grooves are ring shaped recesses.

The combining means includes recesses formed at a predetermined depth in the first bushing and projections extending upwardly from a surface of the second bushing so as to be inserted into the recesses.

BRIEF DESCRIPTION OF THE DRAWINGS

The above object and other advantages of the present invention will become more apparent by describing in detail the preferred embodiment thereof with reference to the attached drawings, in which:

FIGS. 2A and 2B show a hemispheric bearing apparatus according to an embodiment of the present invention, in which FIG. 2A is a longitudinal sectional view of the hemispheric bearing apparatus and FIG. 2B is a cross-sectional view of the hemispheric bearing apparatus, taken along a line 2B—2B.

DESCRIPTION OF THE PREFERRED EMBODIMENT

Hereinafter, preferred embodiments of the present invention will be described in detail with reference to the accompanying drawings.

Figure 2A:
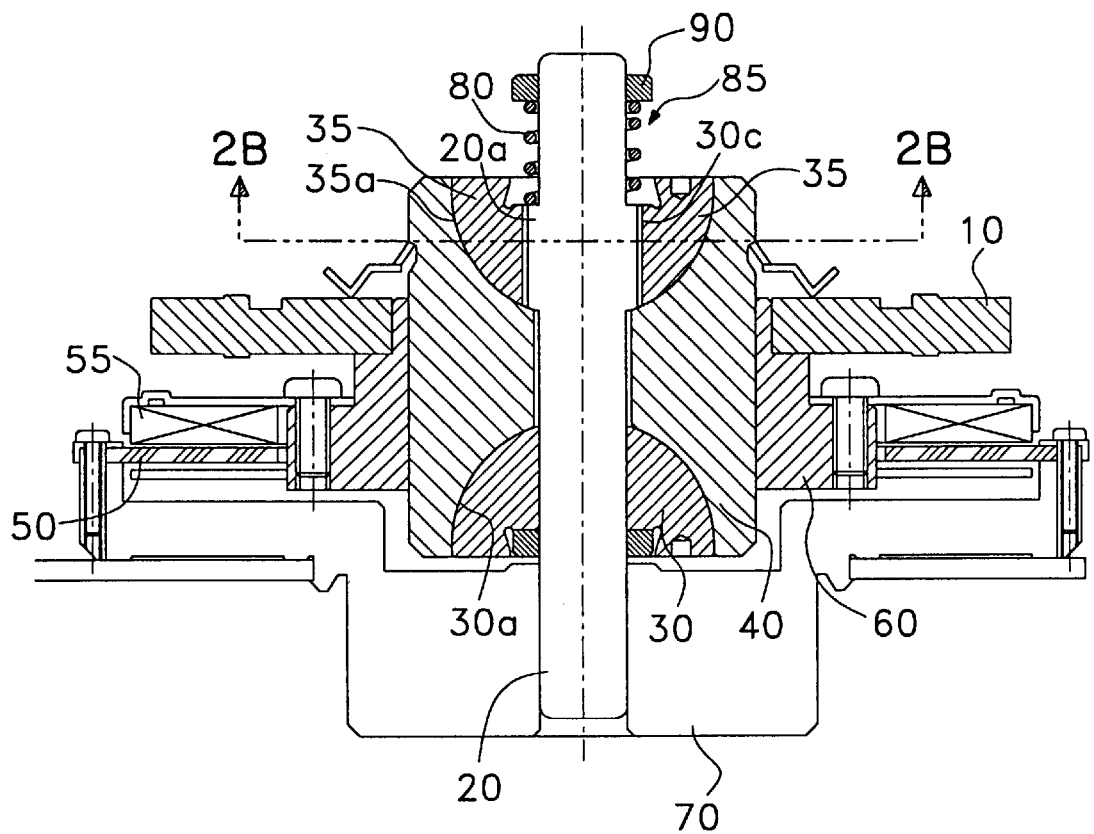
Figure 2B:
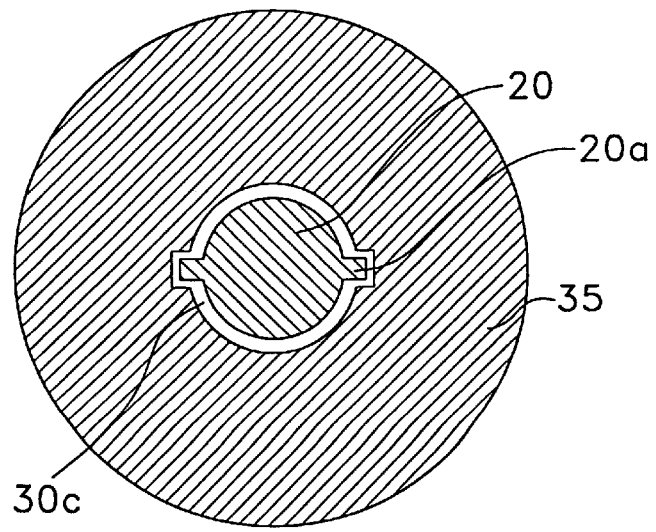

FIGS. 2A and 2B show a hemispheric bearing apparatus according to an embodiment of the present invention, in which FIG. 2A is a longitudinal sectional view of the hemispheric bearing apparatus and FIG. 2B is a cross-sectional view of the hemispheric bearing apparatus, taken along a line 2B—2B. Referring to FIG. 2A, the hemispheric bearing apparatus includes upper and lower hemispheres 35 and 30 which respectively have dynamic pressure generating grooves on a hemispheric surface, a bushing 40 having hemispheric grooves 35a and 30a formed at both ends thereof, in which the hemispheric grooves 35a and 30a respectively receive the upper and lower hemispheres 35 and 30 corresponding thereto, a hemisphere pressing member 85 for forcing the hemispheres 35 and 30 to be positioned closely with the hemispheric grooves 35a and 30a, and driving devices 50 and 55 for rotating the bushing 40.

The upper and lower hemispheres 35 and 30 are formed such that the spheric surfaces have a high sphericity, in which a throughholes respectively are apertured. A fixed shaft 20 is inserted into the throughholes of the upper and lower hemispheres 35 and 30. At this time, the upper and lower hemispheres 35 and 30 are disposed so that the hemispheric surfaces thereof are opposite to each other. The lower hemisphere 30 is press-fitted to the fixed shaft 20 while the upper hemisphere 35 is slidably mounted so as to move along the fixed shaft 20. Referring to FIG. 2B, a pair of engaging grooves 30c are longitudinally formed on an inner surface of the throughhole of the upper hemisphere 35. A pair of projections 20a project from a peripheral surface of the fixed shaft 20 to correspond with the grooves of the throughhole. Accordingly, when the upper and lower hemispheres 35 and 30 are mounted on the fixed shaft 20, the projections 20a of the fixed shaft 20 are engaged with the engaging grooves 30c of the upper hemisphere 35 so as to prevent the upper hemisphere 35 from rotating together with the bushing 40. The bushing 40 is mounted on the fixed shaft 20 to be disposed between the upper and lower hemispheres 35 and 30 so as to receive the upper and lower hemispheres 35 and 30.

The hemisphere pressing member 85 includes a spring 80 for forcing the upper hemisphere 35 to the bushing 40 in order that the upper and lower hemispheres 35 and 30 are positioned closely with the bushing 40, and a stopper 90 for supporting one end of the spring 80 in order to hold the elasticity of the spring 80.

A hub 60 is press-fitted to the bushing 40, on which a polygon mirror 10 and a rotor 55 are mounted. A stator 50 is spaced apart from the rotor 55 at a predetermined distance and mounted on a lower housing 70.

Hereinafter, the operation of the hemispheric bearing apparatus according to the first embodiment of the present invention will be described.

In a state that the bushing 40 stops the rotation, the spring 80 forces the upper hemisphere 35 toward the bushing 40 so that the upper and lower hemispheres 35 and 30 are positioned closely with the bushing 40.

When electric power is applied to the rotor and stator 55 and 50, the bushing 40 rotate with a predetermined velocity. Even through the bushing 40 rotates, the upper hemisphere 35 does not rotate together with the bushing 40 because the engaging grooves 30c thereof are engaged with the projections 20a of the bushing 40. Dynamic pressures are generated in the dynamic pressure generating grooves of the upper and lower hemispheres 35 and 30 as the bushing 40 rotates. At this time, the dynamic pressure at the upper hemisphere 35 is the same as the dynamic pressure at the lower hemisphere 30 because the clearances between the upper and lower hemispheres 35 and 30 and the bushing 40 are the same.

The lower hemisphere 30 cannot rotate because it is press-fitted to the fixed shaft 20, while the upper hemisphere 35 and the bushing 40 are movable in a vertical direction. Therefore, the upper hemisphere 35 and the bushing 40 are pushed upwardly by the dynamic fluid pressure which is generated between the lower hemisphere 30 and the bushing 40. Also, the bushing 40 is pushed downwardly by the dynamic fluid pressure which is generated between the upper hemisphere 35 and the bushing 40. As a result, the bushing 40 rotates without the contacting with the upper and lower hemispheres 35 and 30 even through the spacer of the conventional device is not used in the fluid bearing apparatus of the present invention.

Figure 1:
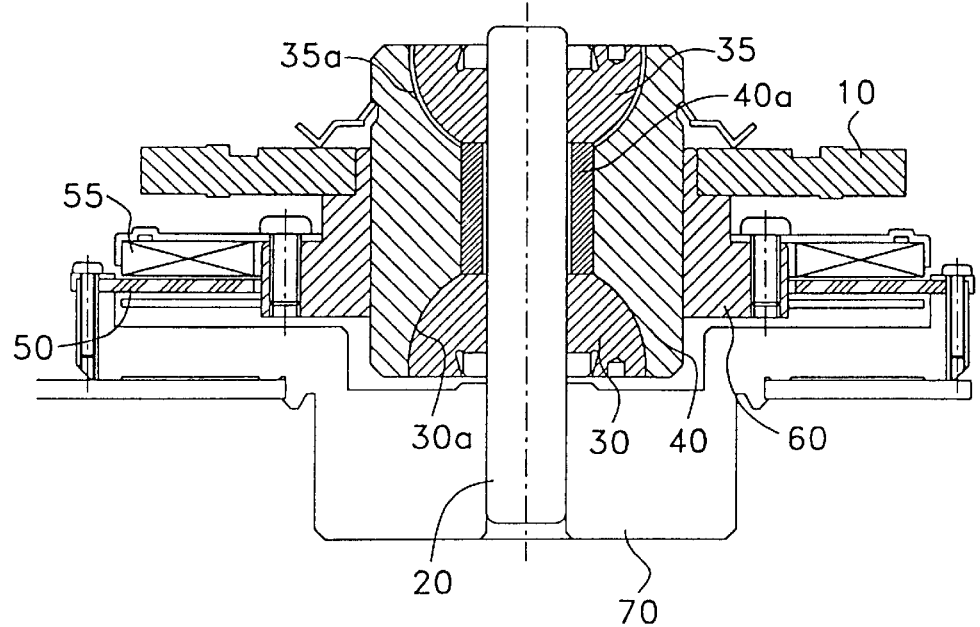
FIG. 1 is a sectional view of a hemispheric bearing apparatus according to an embodiment of a conventional art.
Figure 3:
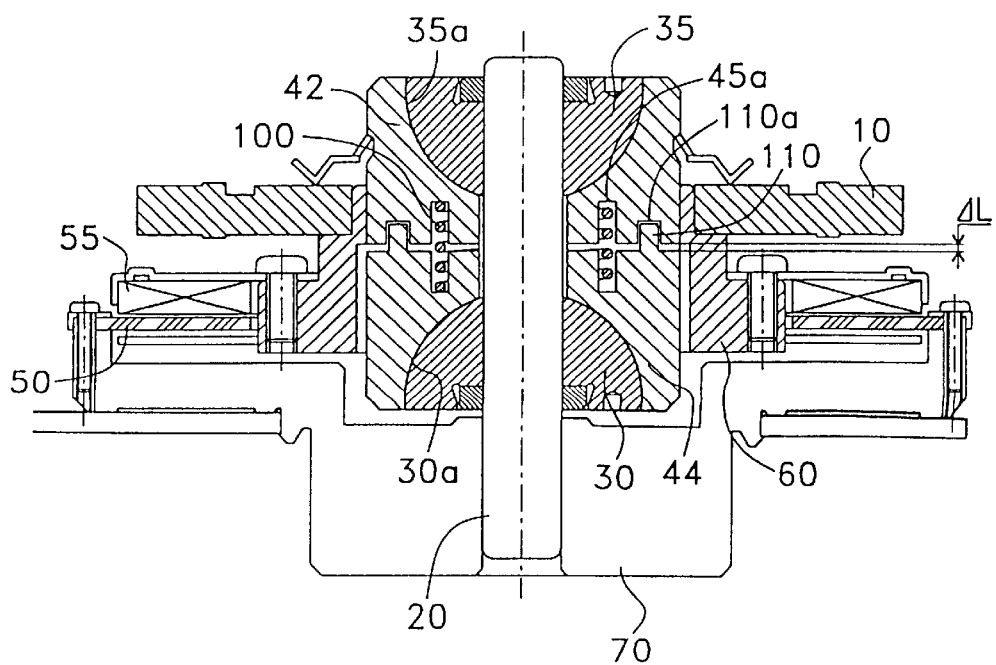
FIG. 3 is a sectional view of a hemispheric bearing apparatus according to another embodiment of the present invention.

FIG. 3 is a sectional view of the hemispheric fluid bearing apparatus according to another embodiment of the present invention. As shown in FIG. 3, the upper and lower hemispheres 35 and 30 are mounted on the fixed shaft 20, which is press-fitted into a housing 70, in such a manner as to be press-fitted to the shaft so that the spheric surfaces are opposite to each other.

Also, the bushing is divided into an upper bushing 42 and a lower bushing 44 which respectively have hemispheric grooves 35a and 30a corresponding to the upper and lower hemispheres 35 and 30. A gap ΔL is provided between the upper and lower bushing 42 and 44. The upper and lower bushing 42 and 44 have annular grooves 45a respectively formed therein. Also, the upper bushing 42 has a plurality of recesses 110a perforated on a lower surface thereof to be adjacent to the annular grooves 45a, while the lower bushing 44 has a plurality of projections 110 formed on an upper surface thereof to correspond to the recesses 110a. A spring 100 is inserted into the annular grooves 45a so as to force the upper and lower bushing 42 and 44 toward the upper and lower hemispheres 35 and 30, so that the upper and lower bushing 42 and 44 are positioned closely with the upper and lower hemispheres 35 and 30. At this time, clearances between the upper bushing 42 and the upper hemisphere 35 and the lower bushing 44 and the hemisphere 30 are several $\mu$m.

Since the upper bushing 42 and the lower bushing 44 are engaged with each other in such a manner that the recesses 110a of the upper bushing 42 respectively receive the corresponding projections 110 of the lower bushing 44, the upper bushing 42 rotates together with the lower bushing 44, thereby preventing a slip of the upper bushing 42.

A hub 60 is press-fitted to the upper bushing 42, on which a polygon mirror 10 and a rotor 55 are mounted. A stator 50 is mounted on a lower housing 70.

Hereinafter, the operation of the hemispheric bearing apparatus according to the second embodiment of the present invention will be described.

The spring forces the upper and lower bushings 42 and 44 toward the upper and lower hemispheres 35 and 30 so that the upper and lower bushing 42 and 44 are positioned closely with the upper and lower hemispheres 35 and 30. In the state such as described above, when electric power is applied to the rotor 55 and the stator 50, the upper bushing 42 rotates together with the lower bushing 44 which is engaged with the upper bushing 42 by means of the projections 110 and recesses 110a. Thereby, dynamic fluid pressures are generated in the dynamic pressure generating grooves of the upper and lower hemispheres 35 and 30 which respectively are in contact with the upper and lower bushing 42 and 44.

Since an acting direction of the dynamic fluid pressures is opposite to that of the spring 100, the upper and lower bushing 42 and 44 rotate without contacting the upper and lower hemispheres 35 and 30 when dynamic fluid pressure is larger than the force of the spring 100 which acts on the upper and lower bushings 42 and 44. The wider the clearances between the upper hemisphere 35 and the upper bushing 42, and the lower hemisphere 30 and the lower bushing 44, the higher the reacting force of the spring 100. Accordingly, after a predetermined amount of time, the clearances between the upper hemisphere 35 and the upper bushing 42, and the lower hemisphere 30 and the lower bushing 44 are held constant.

As described above, the upper and lower hemispheres 35 and 30 are positioned closely with the upper and lower bushings 42 and 44 while the upper and lower bushings 42 and 44 can be resiliently movable along the fixed shaft 20. During the rotation of the upper and lower bushings 42 and 44, the upper and lower hemispheres 35 and 30 are respectively spaced from the upper and lower bushings 42 and 44 by means of the spring 100 so that the upper and lower bushings 42 and 44 can rotate without contacting with the upper and lower hemispheres despite the lack of a spacer for the fluid bearing apparatus. Accordingly, the performance and accuracy of the hemispheric fluid bearing can be prevented from deteriorating.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A hemispheric bearing comprising:

a shaft fixed to a lower housing;

first and second hemispheres spaced at a predetermined distance apart from each other and mounted on said shaft so as to be opposed to each other;

a first bushing having a first hemispheric groove to receive said first hemisphere;

a second bushing having a second hemispheric groove to receive said second hemisphere, said second bushing being spaced at a predetermined distance apart from said first bushing;

a means for resiliently spacing said first bushing apart from said second bushing at the predetermined disstance; and a means for combining said first bushing with said second bushing so that said first bushing and said second bushing rotate simultaneously.

2. A hemispheric bearing as claimed in claim 1, wherein said resilient means includes a spring which is disposed in annular grooves formed at a predetermined depth in said first bushing and said second bushing.

3. A hemispheric bearing as claimed in claim 2, wherein said spring is a coil spring.

4. A hemispheric bearing as claimed in claim 2, wherein said spring is a leaf spring which is wound in a spiral shape and said annular grooves are ring shaped recesses.

5. A hemispheric bearing as claimed in claim 1, wherein said combining means includes recesses formed at a predetermined depth in said first bushing and projections extending upwardly from a surface of said second bushing so as to be inserted into said recesses.

* * * * *